(12) United States Patent
Kraft et al.

(10) Patent No.: US 9,912,874 B2
(45) Date of Patent: *Mar. 6, 2018

(54) REAL-TIME VISUAL EFFECTS FOR A LIVE CAMERA VIEW

(71) Applicant: A9.com, Inc., Palo Alto, CA (US)

(72) Inventors: Adam Wiggen Kraft, Mountain View, CA (US); Colin Jon Taylor, Orinda, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,745

(22) Filed: Jan. 11, 2016

(65) Prior Publication Data

US 2016/0127654 A1 May 5, 2016

Related U.S. Application Data

(63) Continuation of application No. 14/219,700, filed on Mar. 19, 2014, now Pat. No. 9,240,077.

(51) Int. Cl.
*H04N 5/232* (2006.01)
*G06T 19/00* (2011.01)
*G06T 11/00* (2006.01)

(52) U.S. Cl.
CPC ......... *H04N 5/23293* (2013.01); *G06T 11/00* (2013.01); *G06T 19/006* (2013.01); *H04N 5/23229* (2013.01); *H04M 2250/52* (2013.01)

(58) Field of Classification Search
CPC ............ H04N 5/23293; H04N 5/23229; G06T 11/00; G06T 19/006; H04M 2250/52
See application file for complete search history.

(56) References Cited

U.S. PATENT DOCUMENTS

| 7,227,567 | B1 | 6/2007 | Beck et al. | |
| 9,240,077 | B1 * | 1/2016 | Kraft | G06T 19/006 |
| 2001/0017629 | A1 * | 8/2001 | Minagawa | G06T 15/405 |
| | | | | 345/619 |
| 2003/0152285 | A1 | 8/2003 | Feldmann et al. | |
| 2003/0202698 | A1 * | 10/2003 | Simard | H04N 19/60 |
| | | | | 382/195 |

(Continued)

OTHER PUBLICATIONS

Bugeau, "Track and Cut: Simultaneous Tracking and Segmentation of Multiple Objects with Graph Cuts", EURASIP Journal on Image and Video Processing vol. 2008, Article ID 317278, pp. 1 and 7.*

(Continued)

*Primary Examiner* — Maurice L McDowell, Jr.
(74) *Attorney, Agent, or Firm* — Hogan Lovells US LLP

(57) ABSTRACT

Visual effects for element of interest can be displayed within a live camera view in real time or substantially using a processing pipeline that does not immediately display an acquired image until it has been updated with the effects. In various embodiments, software-based approaches, such as fast convolution algorithms, and/or hardware-based approaches, such as using a graphics processing unit (GPU), can be used reduce the time between acquiring an image and displaying the image with various visual effects. These visual effects can include automatically highlighting elements, augmenting the color, style, and/or size of elements, casting a shadow on elements, erasing elements, substituting elements, or shaking and jumbling elements, among other effects.

16 Claims, 9 Drawing Sheets

(56) References Cited

U.S. PATENT DOCUMENTS

| | | |
|---|---|---|
| 2004/0264749 A1 | 12/2004 | Skladnev et al. |
| 2008/0071559 A1* | 3/2008 | Arrasvuori ............. G06Q 30/06 705/26.1 |
| 2009/0285482 A1 | 11/2009 | Epshtein et al. |
| 2011/0007073 A1 | 1/2011 | Belt et al. |
| 2013/0071028 A1 | 3/2013 | Schiller et al. |
| 2013/0089258 A1* | 4/2013 | Herling ............. G06K 9/00771 382/173 |
| 2013/0121577 A1 | 5/2013 | Wang et al. |
| 2013/0300767 A1* | 11/2013 | Kochi .................. G06T 19/006 345/633 |
| 2015/0147047 A1 | 5/2015 | Wang et al. |

OTHER PUBLICATIONS

Haritaoglu, "Scene Text Extraction and Translation for Handheld Devices", IBM Almaden Research, San Jose, CA 95120, USA, 2001, IEEE.*

"Non Final Office Action dated Jun. 12, 2015" received in U.S. Appl. No. 14/219,700.

"Notice of Allowance dated Nov. 6, 2015" received in U.S. Appl. No. 14/219,700.

* cited by examiner

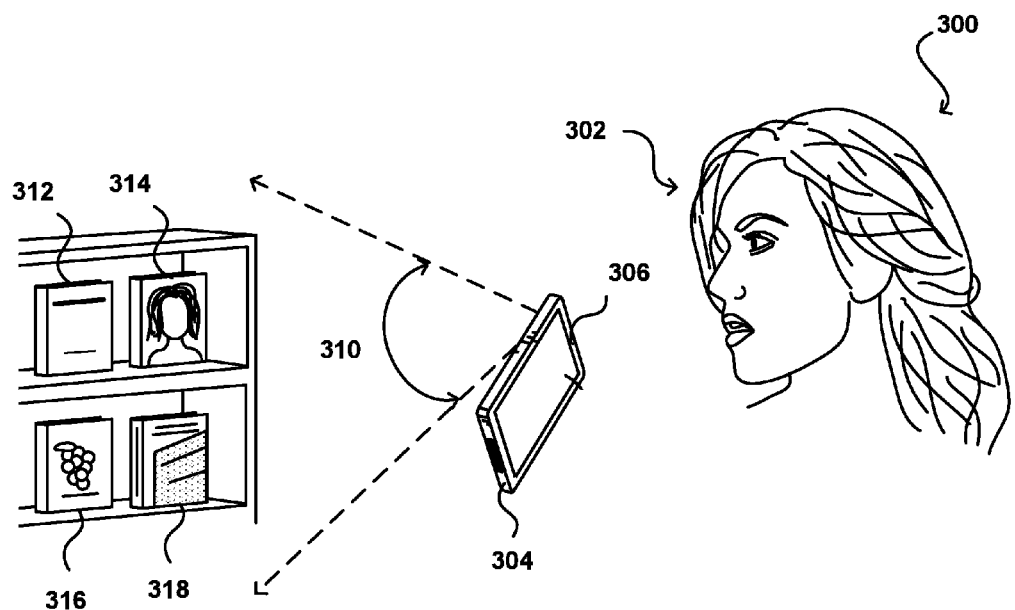
FIG. 3A
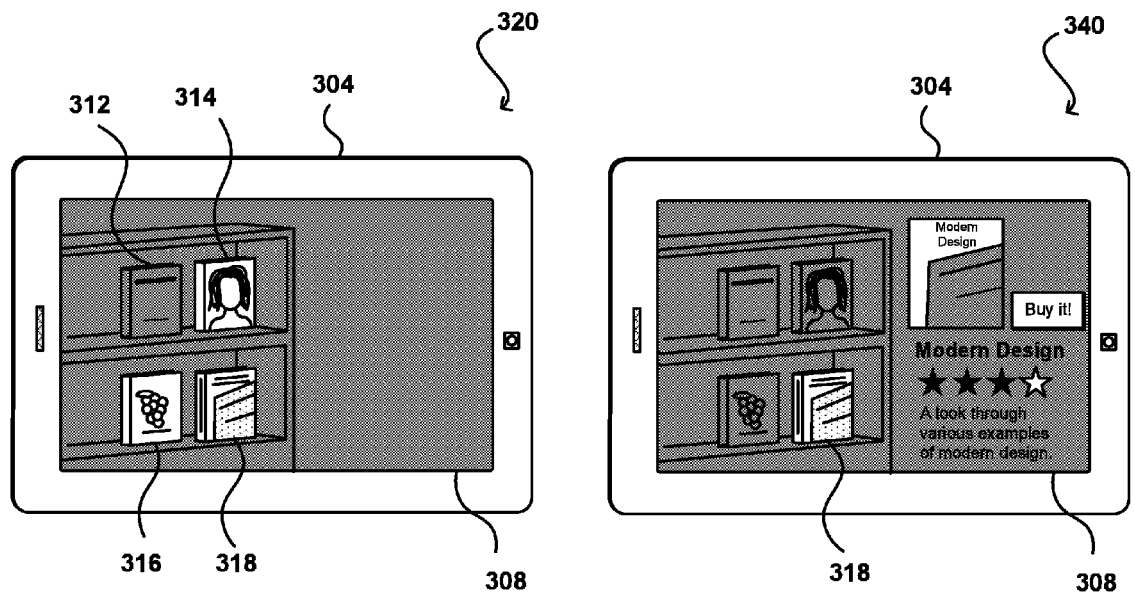
FIG. 3B
FIG. 3C

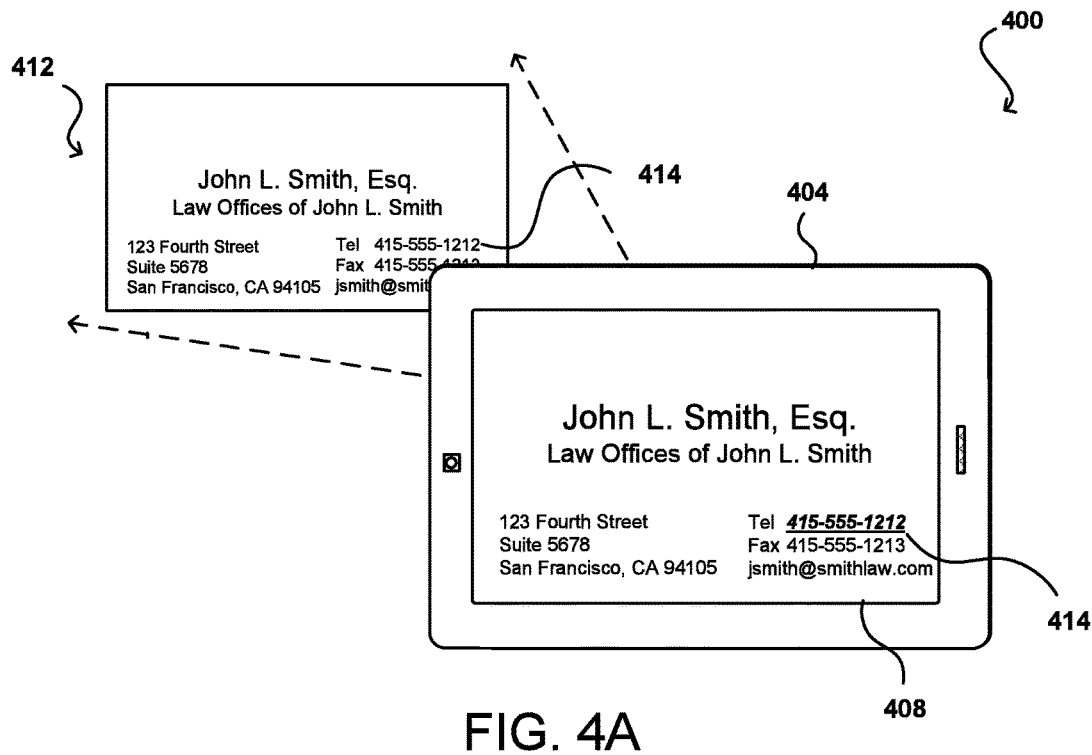
FIG. 4A
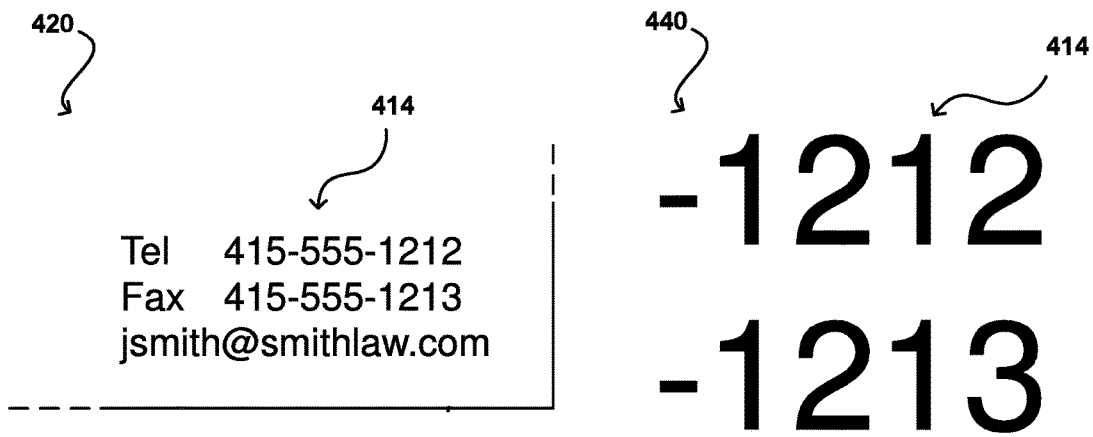
FIG. 4B
FIG. 4C

REAL-TIME VISUAL EFFECTS FOR A LIVE CAMERA VIEW

CROSS-REFERENCES TO RELATED APPLICATIONS

This application is a continuation of U.S. application Ser. No. 14/219,700, entitled "REAL-TIME VISUAL EFFECTS FOR A LIVE CAMERA VIEW," filed Mar. 19, 2014; which is incorporated herein by reference for all purposes.

BACKGROUND

As personal electronic devices become increasingly sophisticated, people are using such devices in new and interesting ways. For example, personal or portable electronic devices, such as smart phones, tablets, portable media players, and e-book readers, can be used to "augment reality." That is, an electronic device can be used as a viewfinder into the real world and virtual elements can be overlaid to create a reality that is enhanced or augmented. Augmented reality can be implemented for applications as varied as visual design, medical care, gaming, navigation, or information retrieval. Augmented reality for information retrieval can be especially advantageous for users. For example, an electronic device can be used to obtain a view of an object or location, and a computer-assisted contextual layer can be displayed on top of the view to provide information about the object or location. Conventional systems and techniques, however, may not offer a dynamic or engaging user experience, such as by overlaying virtual elements over a still image instead of a live camera view. Other conventional approaches may provide interfaces that are less than optimal for users. As an example, there may be noticeable lag or latency in the presentation of virtual elements in conventional systems. As another example, there may be visual artifacts in the display of the live camera view and the computer-assisted contextual layer for certain conventional approaches. As still other examples, conventional interfaces may limit rendering of virtual elements to a small portion of a display or limit rendering to certain types of elements (e.g., text or primitive shapes).

BRIEF DESCRIPTION OF THE DRAWINGS

Various embodiments in accordance with the present disclosure will be described with reference to the drawings, in which:

FIGS. 3A, 3B, and 3C illustrate an example of displaying visual effects for objects of interest within a live camera view in accordance with an embodiment;

FIGS. 4A, 4B, and 4C illustrate examples of display visual effects for text elements within a live camera view in accordance with various embodiments;

DETAILED DESCRIPTION

Systems and methods in accordance with various embodiments of the present disclosure may overcome one or more of the aforementioned and other deficiencies experienced in conventional approaches for incorporating virtual elements within a live camera view displayed on a screen of a computing device. In particular, various approaches implement a processing pipeline that does not display an acquired image until the image has been modified with visual effects for elements of interest. In various embodiments, "quick processing" is used to update the acquired image with one or more visual effects for elements of interest within the image so that the updated image is presented for display in a live camera view in real-time or substantially real time. In some embodiments, quick processing can include calculating or updating a binary mask or segmentation mask from an acquired image. A binary mask separates elements of interest (e.g., foreground elements) in an image from the remaining portion of the image (e.g., background elements). A segmentation mask can provide additional levels of distinction for certain classes of objects. For example, the object of interest may be a person and the segmentation mask could include information distinguishing the user's head from his or her torso and/or other portions of his or her body in addition to information identifying the person as a whole from background elements. A segmentation mask can also be used to differentiate between different classes of objects in an image, such as identifying among which objects in an image are detected as persons and which objects are motor vehicles.

After acquiring an image and calculating or updating a binary mask or segmentation mask, the acquired image can be updated with visual effects for elements of interest. These visual effects can include automatically highlighting elements, augmenting the color, style, and/or size of elements, casting a shadow on elements, erasing elements, substituting elements, or shaking and jumbling elements, among other effects. Some of these effects require little computation but other effects may require fast implementations to ensure a satisfying user experience. Thus, in various embodiments, quick processing can be achieved using software-based approaches, such as fast convolution algorithms and, alternatively, or in addition, hardware-based approaches, such as using a graphics processing unit (GPU) to perform at least some of the processing for generating the binary mask or segmentation mask or the visual effects. These various approaches reduce the time between acquiring an image and posting the augmented image such that visual effects can be displayed within a live camera view in real-time or substantially real-time.

Various other functions and advantages are described and suggested below as may be provided in accordance with the various embodiments.

Figure 1:
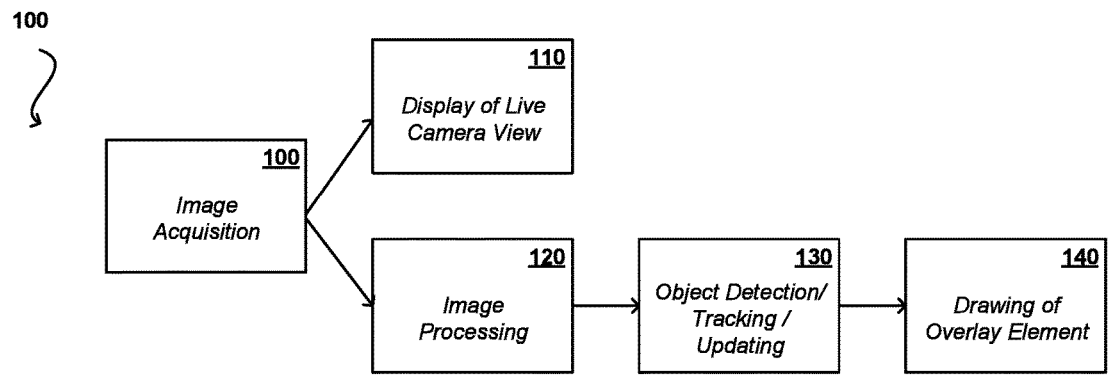
FIG. 1 illustrates an example of a conventional processing pipeline for overlaying virtual elements within a live camera view.

FIG. 1 illustrates an example 100 of a conventional processing pipeline for overlaying virtual elements within a live camera view. The conventional processing pipeline begins by acquiring image data 100 and then displaying the acquired image data to provide a live camera view of an object and/or scene 110. While the live camera view is presented on a display screen, the image data is processed to generate the visual effect desired. As an example, a conventional video chat application may include a feature for enabling the user to overlay virtual elements such as funny hats or other headgear, glasses, facial hair, and other embellishments over the image of the user in the video chat. To enable this feature, the acquired image is processed 120 after it has already been presented on screen. The processing can involve detecting and tracking the user's head or face 130 in the acquired image and then drawing the virtual element on screen based on where the user's head or face was previously tracked. As a result of this split in the conventional processing pipeline, the information from processing the image will be out of sync with the live image being shown on screen. In the example of the video chat application, there may be noticeable lag or latency between movement of the user's head or face and the virtual element overlaying the user. In other conventional systems, the overlaid virtual element may also be dynamic, such as an application that attempts to draw an outline around an element of interest. Due to the disjunction between image acquisition and effects rendering in the conventional processing pipeline, there may be visual artifacts that can hinder the user's experience.

Figure 2:
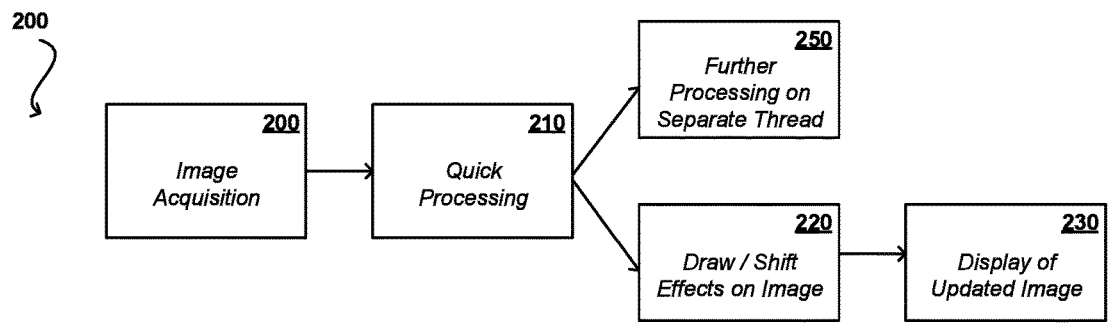
FIG. 2 illustrates an example of a processing pipeline for displaying visual effects for elements of interest within a live camera view in real-time in accordance with an embodiment.

FIG. 2 illustrates an example 200 of a processing pipeline for displaying visual effects for elements of interest within a live camera view in real-time or substantially real-time in accordance with an embodiment. It should be understood that, for any process discussed herein, there can be additional, fewer, or alternative steps performed in similar or alternative orders, or in parallel, within the scope of the various embodiments unless otherwise stated. In this example, the process begins with image acquisition 200. However, unlike the conventional processing pipeline, approaches in accordance with various embodiments do not display the acquired image data until the image has been modified to include the desired visual effects. To enable this approach yet maintain a live camera view in real-time or substantially real-time, "quick processing" techniques 210 can be used to minimize the time between image acquisition 200 and presenting the updated image 230. In some embodiments, the quick processing 210 can involve retrieving a binary mask or segmentation mask from a separate thread 250 that processes previously acquired image data or retrieving the binary or segmentation mask from a remote computing system that is used to process previously acquired image data. Additionally or alternatively, the quick processing 210 can include updating the binary mask or segmentation mask according to a translation, a rotation, a scale, an affine transformation, and/or a projective transformation such that the mask is correctly aligned with the text or object(s) of interest in the acquired image. In various embodiments, the quick processing can be facilitated using hardware-based approaches, such as processing via GPU at various stages of the pipeline, and/or software-based approaches, such as using fast convolution algorithms.

A graphics processing unit or GPU is an integrated circuit originally designed for performing the complex mathematical and geometric calculations associated with rendering graphics. The highly parallel nature of graphics computations enable GPUs to use additional transistors for computation, achieving higher arithmetic intensity with the same transistor count. Thus, state-of-the-art GPUs can provide tremendous memory bandwidth and computing power due to the intrinsic nature of graphics processing. GPUs are also becoming increasingly flexible with General-Purpose GPU (GPGPU) computation approaches emerging to support new programmability features of GPUs. High level programming languages and platforms for the GPU include the Brook programming language developed by Stanford University, the Compute Unified Device Architecture (CUDA) developed by NVIDIA® Corp. of Santa Clara, Calif., and the open-source OpenCL®. In various embodiments, GPGPU computing techniques can be used to accelerate various stages of the processing pipeline for displaying visual effects in a live camera view, including calculating the segmentation mask or processing certain visual effects. For example, the erasure effect involves applying a combination of linear convolution filters that can be dramatically sped up using a GPU.

Software-based approaches can also be used to enable the quick processing desirable for generating visual effects in real-time or substantially real-time 220. Such approaches can include fast linear convolutions, such as for the erasure effect. As mentioned, in at least some embodiments, calculating the binary mask or segmentation mask and other processing can be performed on a separate thread 250 to ensure that an acquired image can be displayed in real-time or substantially real-time. In such embodiments, the rendering or shifting 220 to be performed on the most current acquired image may rely on a binary or segmentation mask corresponding to previously acquired image data, such as from a separate thread or process 250 executing locally or via a remote server. The current process may update the binary mask or segmentation task by performing a linear transformation, such as a translation, rotation, scale, affine transformation, or projective transformation, to align text or an object of interest in the most current acquired image and the binary mask or segmentation mask corresponding to previously acquired image data. In this manner, the most current acquired image can be displayed 230 with the desired visual effect in real-time or substantially real-time.

FIGS. 3A, 3B, and 3C illustrate an example of displaying visual effects for objects of interest within a live camera view in accordance with an embodiment. In example 300 of FIG. 3A, a user 302 is depicted employing her computing device for product discovery or to learn more about a particular product she may be interested in purchasing or otherwise acquiring. In this example, the user 302 is situated at a location that has a collection of books 312, 314, 316, and 318. Using an appropriate application executing on a computing device 304, the user is able to obtain an image of the books by positioning the computing device such that the books are within a field of view 310 of at least one camera 306 of the computing device. Although a portable computing device (e.g., a smart phone, a tablet computer, or an e-book reader) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, portable media players, and wearable computing devices among others.

In this example, a camera 306 on the device 304 can capture image information including the books 312, 314, 316, and 318. A first image maybe processed to determine whether any objects included in the first image match any database objects. In an embodiment, the matching process may be performed via a callback to an image matching or object recognition system or service. The image matching or object recognition system or service may operate on the device and/or may be a part of a remote system or service as discussed later herein. The recognition system or service may determine that one or more objects in the first image match database objects. Approaches for matching an object captured in an image to a database object are discussed in co-pending U.S. patent application Ser. No. 14/209,642 entitled, "Object Recognition of Feature-Sparse or Texture-Limited Subject Matter," filed Mar. 13, 2014, which is incorporated herein by reference. In an embodiment, the product discovery application may be associated with an electronic marketplace and the database objects may be products available for purchase from the electronic marketplace.

A segmentation mask, which separates objects of interest located in the foreground from the background, is calculated based on each of the objects that are matched by the recognition system or service. In some embodiments, there may be an initial delay associated with the callback to the matching system or service and/or the initial calculation of the segmentation mask but processing of subsequent images or frames may simply involve updating the segmentation mask such that rendered objects can be incorporated in a live camera view in real-time or substantially real-time. To reduce the processing time associated with calling to the image matching or object recognition service and/or the initial calculation of the segmentation mask, some embodiments may request that the user point to the object of interest on screen or draw a bounding box around the object of interest.

In the example 320 of FIG. 3B, the image matching system or service has recognized books 314, 316, and 318 but has not recognized book 312. This may occur for several different reasons such as the book not being available for purchase from the electronic marketplace, the book being too nondescript to recognize, image acquisition errors (e.g., poor lighting conditions, specular reflection, clutter, occlusion, poor resolution due to the distance of the user from the book), or the characteristics of the image sensor and/or lens, among other considerations. Here, books 314, 316, and 318 are rendered in full color while the background is rendered in grayscale for display on screen 308 of computing device 304 based on the segmentation mask. This enables the books 314, 316, and 318 to stand out from the rest of the scenery depicted in example 320. Further, this visual effect can indicate to the user that these objects are interactive within the live camera view as further shown in the example of FIG. 3C.

FIG. 3C illustrates an example 340 of the user selecting book 318 to retrieve additional information about the book. In this example, the user selection of book 318 causes the segmentation mask to be updated such that only the pixels corresponding to book 318 are rendered in full color for display while books 314 and 316 may be rendered in grayscale or more muted colors to indicate that books 314 and 316 are not currently selected. Information relating to book 318 is then retrieved and displayed on screen 308 of computing device 304. In some embodiments, the information for each recognized object can be obtained and stored on the device during the initial callback to the image matching service. In other embodiments, the information can be retrieved as a separate call to a remote system or service as discussed later herein.

FIGS. 4A, 4B, and 4C illustrate examples of displaying visual effects for text elements within a live camera view in accordance with various embodiments. In the example situation 400 of FIG. 4A, at least one camera of a computing device 404 is used to capture an image of an object including text. Here, the object is a business card 412 including a person's name, business title, address, phone number 414, and other contact information. Prior to displaying the image to the display screen 408 of the computing device, a preliminary processing step may include classification of the object of interest represented in the image. In other embodiments, the context in which the live camera view is being utilized by the user may indicate the category or type of the object of interest. For instance, if the live camera view is invoked by a product discovery application, the object of interest is presumed to be a physical item. As another example, the user may be executing a function or application for updating her electronic contacts such that the object of interest is presumed to comprise of text. In this example, the user may be operating a function or feature of a telephony application that allows a user to scan an image containing one or more telephone numbers and select a recognized telephone number to dial (i.e., single-touch dialing) without requiring the user to manually enter each digit of the telephone number. As will be appreciated by those of ordinary skill in the art, an OCR engine can be used to recognize text generally and regular expressions can be implemented for specifically recognizing telephone numbers. Using these well-known techniques, a binary mask can be calculated to separate the recognized telephone number from other text and background.

Upon recognizing the telephone number 414 within the captured image, various visual effects can be rendered to indicate to the user that the telephone number has been recognized and that the user may select it for single-touch dialing. In the example 400 of FIG. 4A, the recognized phone number 414 is bolded, underlined, and italicized when displayed on screen 408. In other embodiments, recognized telephone numbers can be rendered in a different color, such as a more striking color, for display on the screen 408. Alternatively, text of interest can be displayed in its original color and the remaining portions of the text that can be rendered in a different color, such as a more muted color. In other embodiments, the size of recognized text can be increased or decreased and/or the font can be changed.

FIG. 4B illustrates another example 420 of how text of interest can be rendered for display within a live camera view. In this example, the telephone number 414 is rendered such that a color or a color gradient extends from the outline or contours of each digit of the telephone number 414 to produce a "highlighting" effect. In some embodiments, this effect can be time-varying such that the size or width of the highlighting alternates between one of two sizes or widths or otherwise changes according to a repetitive pattern to simulate a "glowing" or pulsating effect. In still other embodiments, a more graphical implementation could be implemented instead of a single color or color gradient. For example, text of interest can be rendered to simulate the appearance that the text is on fire.

FIG. 4C illustrates another example 440 of rendered text incorporated within a live camera view. In this example, the telephone number 414 can be seen including a shadow to simulate the illusion of three-dimensionality or to make the telephone number stand out with respect to the other portions of the text. In an embodiment, an image including a large body of text, such as a book chapter, can be displayed within a live camera view with a "drop shadow" effect by increasing the size of the first character of the chapter, adding a shadow to the first character, and realigning the remaining portion of the text.

Figure 5A:
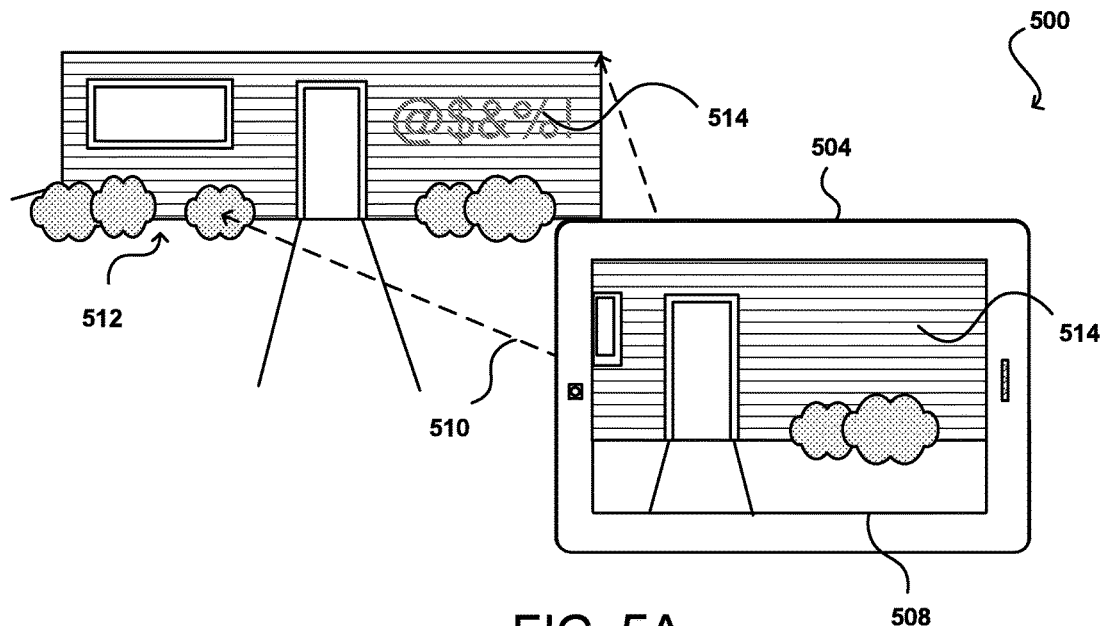
FIGS. 5A and 5B illustrate examples of displaying visual effects for text or text-based elements of interest within a live camera view in accordance with various embodiments.
Figure 5B:
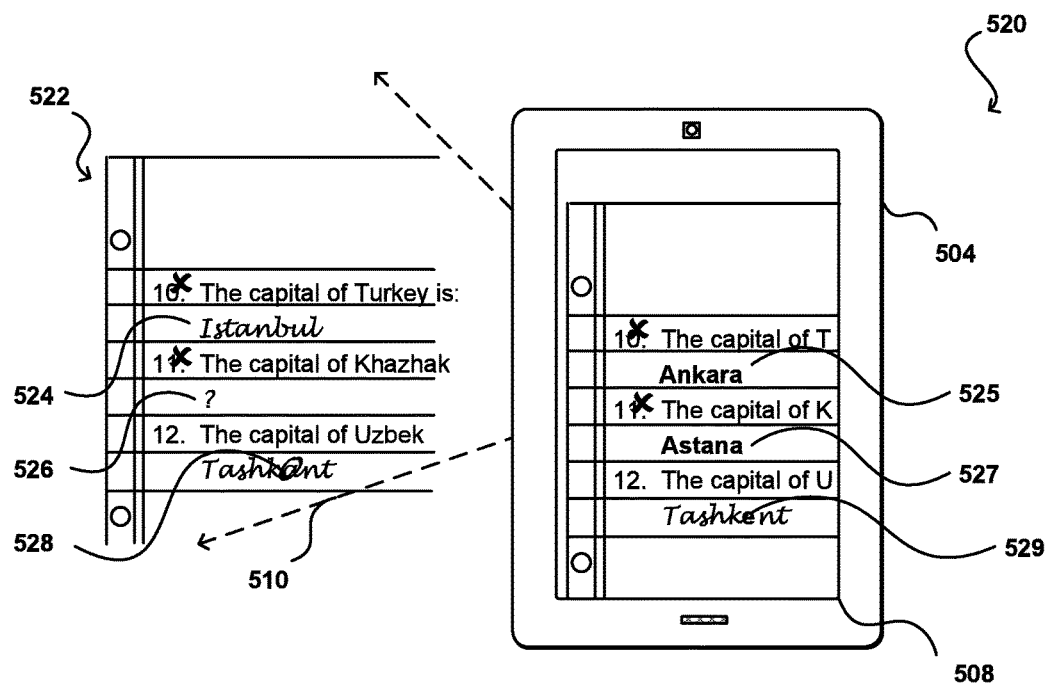

FIGS. 5A and 5B illustrate additional examples of displaying visual elements for text or text-based elements of interest within a live camera view in accordance with various embodiments. In the example situation 500 of FIG. 5A, a computing device 504 is used to capture a scene of a building 512 within a field of view 510 of a camera of the device. In the actual scene, the building has been defaced by graffiti 514 with objectionable language. In this example, the computing device may include an application or functionality that is capable of deciphering handwritten text and rendering the handwritten text to a more legible form. Further, the example computing device may include parental controls for prohibiting display of objectionable material for child users. Therefore, when a child user operates the computing device to capture a live camera view of the building 512, the graffiti 514 is "erased" from the building when presented on display screen 508. This can be achieved, in this example, by erasing the pixels corresponding to the graffiti 514 and filling in the erased pixels using information of the pixels surrounding the graffiti.

In various embodiments, the erasing effect can be a preliminary step to another visual effect. FIG. 5B illustrates an example 520 of the computing device 504 being used by a student to review a homework assignment or test 522. The original homework assignment or test includes several handwritten answers 524, 526, and 528. The answers 524 and 526 originally provided by the student were marked incorrect while a portion of the answer 528 was marked for misspelling. In this example, the computing device includes an application or functionality to enable students to review their homework, tests, and other similar materials. When the application is activated, the original incorrect answers and/or misspellings are erased as discussed elsewhere herein, and the correct answers and/or spellings are substituted for display on the screen 508 of the computing device. In particular, incorrect answer 524 is erased in the live camera view displayed on screen 508 of computing device 504 and substituted with the correct answer 525. Similarly, incorrect answer 526 is substituted with correct answer 527. Finally, the misspelled character in answer 528 is replaced with the correct character 529. In some embodiments, the erase and substitution effects can be applied towards translation applications or functionality. For example, original text in a first language can be erased and substituted with text in a second language. In other embodiments, text can be scanned by a computing device and certain words can be erased and substituted with synonyms as a learning tool to enhance one's vocabulary.

Figure 6A:
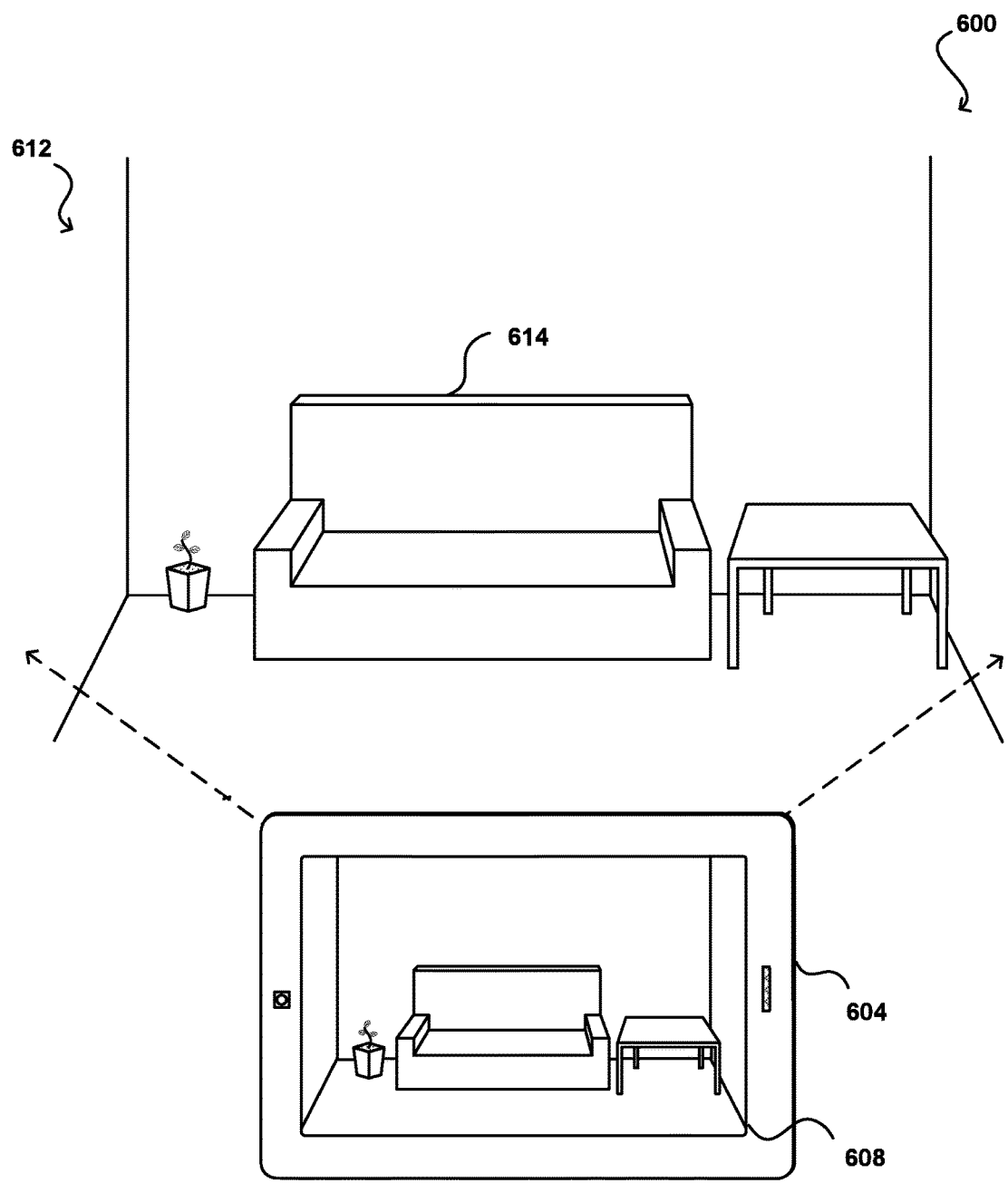
FIGS. 6A and 6B illustrate examples of displaying visual effects for objects of interest within a live camera view in accordance with various embodiments.
Figure 6B:
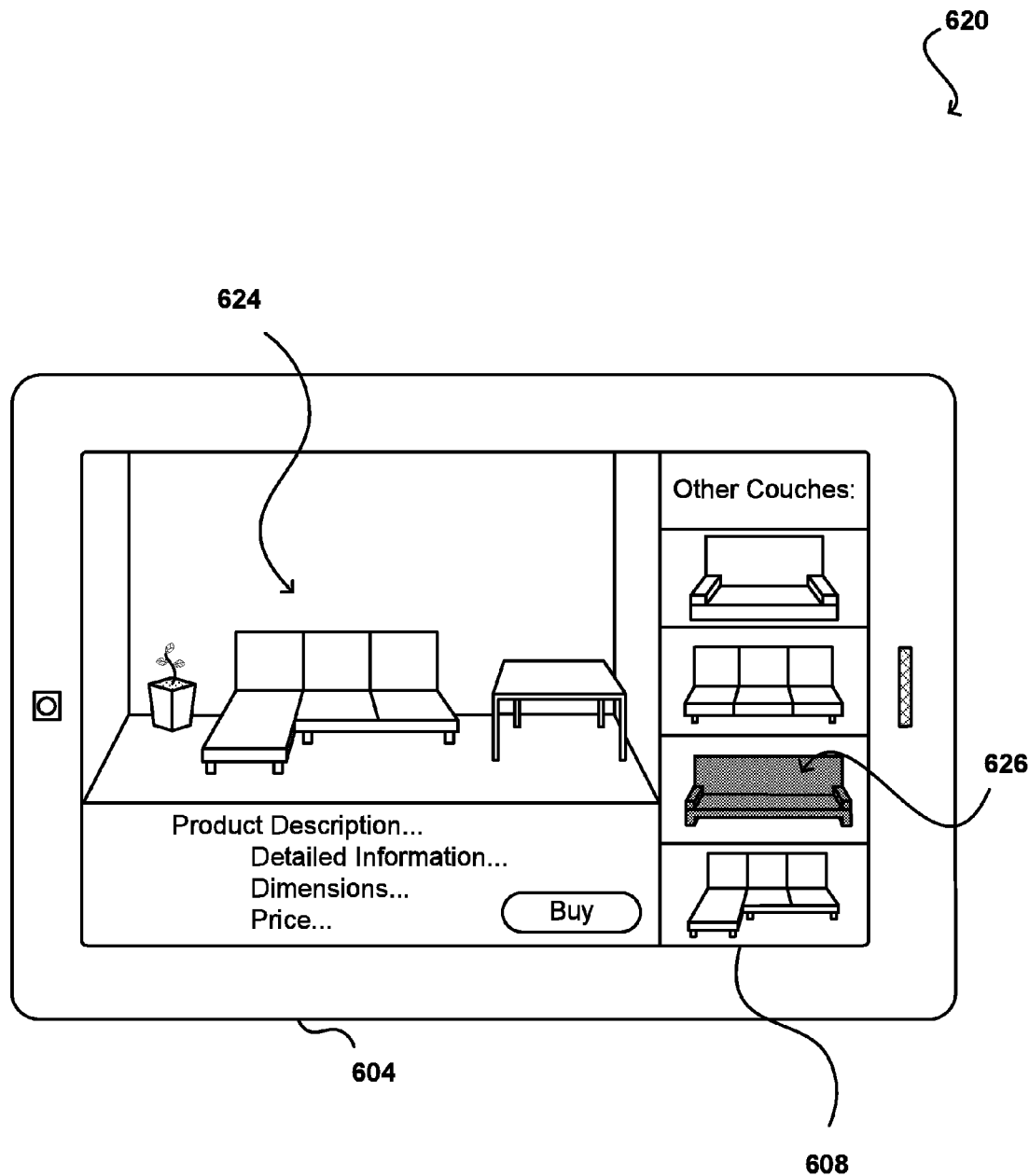

Although the examples of FIGS. 4A, 4B, 4C, 5A, and 5B are directed towards approaches for including rendering of text or text-based objects within a live camera view, it will be appreciated that the visual effects, including highlighting, glowing, changes to color, style, and/or size, adding a shadow, erasing, and/or substitution, among others, can also be implemented for other objects of interest. For example, FIGS. 6A and 6B illustrate an example of erasing and substituting physical objects of interest within a live camera view in accordance with an embodiment. FIG. 6A depicts an example 600 of a computing device 604 being used to capture a scene 612 of a user's living room, including a flower pot, a sofa 614, and a side table 608. In this example, the computing device includes an application or functionality for redecorating the user's home as seen in the example 620 of FIG. 6B. When such application or functionality is activated, the user can substitute a representation of an actual object displayed on screen 608, such as replacing sofa 624 in FIG. 6A with the sofa 626 in FIG. 6B. Alternatively, or in addition, the user can change a color or pattern of the sofa, and elect to reupholster her existing sofa with a desired color or pattern. Thus, the user can determine whether new furniture or upholstering fits, physically and stylistically, with the rest of her home. Further, the user can rearrange objects displayed on the screen such that the user can virtually redecorate her home without having to physically move furniture around. In an embodiment, the redecorating application or functionality may be associated with an electronic marketplace, and the items that can be substituted for actual objects are available for purchase from the electronic marketplace. In an embodiment, the items may be filtered based on the physical dimensions of each item and the available space in a room. In various embodiments, the visual effects discussed throughout herein can be performed on clothing, shoes, or jewelry, among other types of products. It will be appreciated that these functions can be enabled while the user is wearing the clothing item, shoes, or jewelry and the user is capturing a self-portrait or "selfie."

In an embodiment, objects of interest can be rendered so as to appear to be "shaking" or "jumbling." Text of interest can appear to be shaking by moving the characters of the text over time. Similarly, an object of interest can be moved from one position to a second position continuously or other repetitive pattern to simulate shaking of the object. A jumbling visual effect would cut out the text or object of interest and move it around screen to allow the user to easily notice it.

Figure 7:
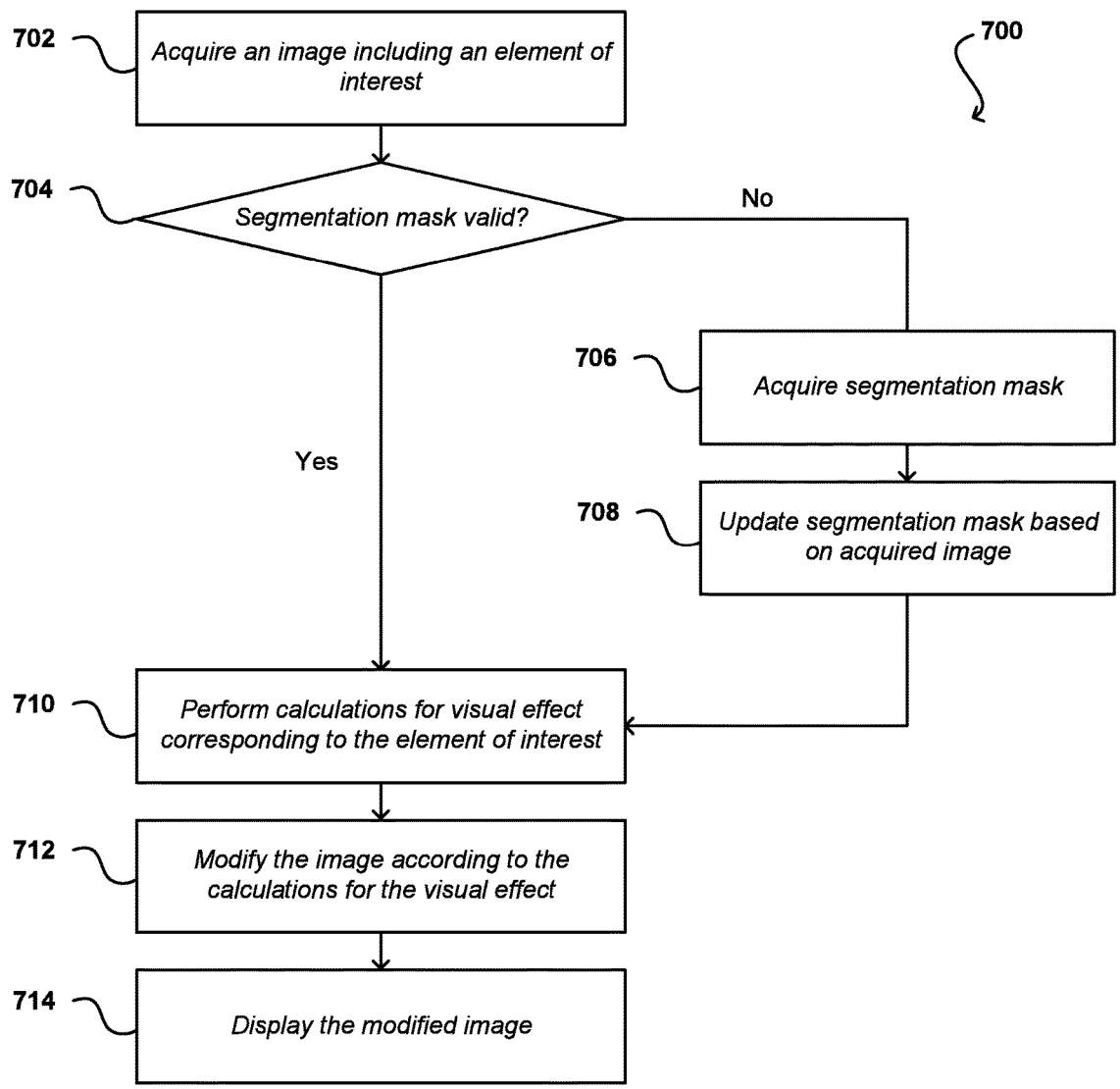
FIG. 7 illustrates an example process for displaying visual effects for elements of interest within a live camera view in accordance with an embodiment.

FIG. 7 illustrates an example process 700 for displaying visual effects for elements of interest in a live camera view in accordance with an embodiment. The process 700 may be initiated from a stand-alone application or app on a computing device, such as the product discovery app illustrated in FIGS. 3A, 3B, 3C, 6A, and 6B or the translation app illustrated in FIG. 5B or as a feature, service, or utility of a computing device, such as the single-touch dialing feature illustrated in FIG. 4A, 4B, or 4C or the parental control feature illustrated in FIG. 5A. The process may begin by acquiring an image including an element of interest 702, such as by operating a camera of a computing device. After the image has been acquired, a determination can be made whether a pre-existing binary mask or segmentation mask is valid for the acquired image 704. If the process is being executed for the first time and there is no pre-existing binary mask or segmentation mask or if the binary mask or segmentation mask is otherwise invalid, the binary mask or segmentation mask can be calculated 706, such as within a separate thread that processes previously acquired images as illustrated in FIG. 2. It will be appreciated that the separate thread can be running on the same computing device or may be a process executing on a remote computing system. In certain situations, the binary mask or segmentation mask corresponding to previously acquired images may not reflect the current state of elements of interest within the most recently acquired image. In such cases, the binary mask or segmentation mask can be updated 708 to align the elements of interest in the most recently acquired mage with the binary mask or segmentation mask, such as by linear transformations including translations, rotations, scales, affine transformations, projective transformations, among others.

Approaches for calculating a segmentation mask can include mean-shift clustering, active contours, graph cuts, among others. The mean-shift approach finds clusters in the spatial and color space [l, u, v, x, y] where l is the brightness, u and v are the chrominance, and x and y are the location. A large number of hypothesized cluster centers are randomly chosen, and each cluster center is moved to the mean lying inside a multidimensional ellipsoid centered on the cluster center, with some of clusters merging during this mean-shift process. The vector corresponding to the old and new cluster centers are called the mean-shift vectors, and the mean-shift vectors are calculated iteratively until the cluster centers do not change position.

In active contours approaches, a candidate object is segmented by transforming a closed contour of the candidate object's boundary such that the contour tightly encloses the candidate object according to an energy function, such as:

$$E(C)=\int_0^1 E_{int}(v)+E_{im}(v)E_{ext}(v)ds,$$

where s is the arc-length of the contour C, $E_{int}$ specifies the regularization constraints, $E_{im}$ is the image-based energy, and $E_{ext}$ specifies additional constraint. $E_{int}$ typically includes a curvature term, first-order ($\nabla v$), or second-order ($\nabla^2 v$) continuity terms to find the shortest contour. The image-based energy, $E_{int}$, can be computed locally or globally. Local information is often determined from an image gradient evaluated around the contour while global features are computed inside and outside the object. Global features can include color and texture.

In graph cut methods, calculating the segmentation mask is approached as a graph partitioning problem with pixels representing nodes of a graph that are partitioned into disjoint subgraphs by pruning the weighted edges of the graph. The total weight of the pruned edges between two subgraphs is called a cut, and the weights may be based on similarities in color, brightness, and/or texture. In one embodiment, a minimum cut criterion can be used to find partitions that minimize a cut. In another embodiment, a normalized cut can be used that depends on edge weights as well as the ratio of the total connection weights of nodes in each partition to all nodes of the graph. In an embodiment, the GrabCut algorithm is used to calculate the segmentation mask from an acquired image. GrabCut is initiated with a user-specified bounding box around the object to be segmented. The algorithm continues by estimating the color distribution of the target object and that of the background using a Gaussian mixture model. This is used to construct a Markov random field over the pixel labels, with an energy function that prefers connected regions having the same label, and running a graph cut based optimization to infer their values. As this estimate is likely to be more accurate than the original, taken from the bounding box, this two-step procedure is repeated until convergence. Estimates can be further corrected by the user by pointing out misclassified regions and rerunning the optimization. The method also corrects the results to preserve edges. Additional information regarding the GrabCut algorithm is discussed in Carsten Rother et al., "Grabcut: Interactive foreground extraction using iterated graph cuts." In *ACM Transactions on Graphics (TOG)*, vol. 23, no. 3, pp. 309-314. ACM, 2004, which is incorporated herein by reference.

After a valid binary mask or segmentation mask is calculated from the acquired image or otherwise obtained, various visual effects can be rendered for particular elements of interest 710 including highlighting elements, augmenting the color, style, and/or size of elements, casting a shadow on elements, shaking and jumbling elements, erasing elements, or substituting elements, among other possibilities. A highlighting effect draws a border around an element of interest in the acquired image using the contours of the region corresponding to the element in the segmentation mask. As discussed, this effect can be time-varying such that the size or width of the border alternates or otherwise drawn according to a pattern to give an impression that the object is glowing.

In some embodiments, the color, style, and/or size of elements can be augmented in the acquired image. For example, the hue of a particular region of the segmentation mask can be altered in various applications. This effect can be implemented for the element of interest by changing the color of the pixels in the acquired image corresponding to that element's region in the segmentation mask to emphasize that element in the live camera view. This effect can also be implemented for other regions of the mask not corresponding to the element, such as changing the color to more subdued colors.

The erasure effect erases the pixels corresponding to the element of interest by filling in those pixels using information from pixels surrounding the element of interest. As discussed, this effect can be achieved in real-time using a combination of linear convolution filters. Given the segmentation mask, pixels located outside the contours of the region of the element of interest in the mask can be blended into the pixels of the element of interest. In some embodiments, a GPU can be used to further speed up many of the convolution operations. Further, the GPU can be used to shift different regions of the image if an effect only requires to be transformed between frames. The substitution effect follows the erasure effect and involves replacing the erased element of interest with a second element. This is especially advantageous for applications translating text to a different language, deciphering handwritten text, or virtual shopping. The shaking effect involves erasing the element of interest from a first position and moving the element to a second position over a period of time. The jumbling visual effect cuts out the element of interest and moves it around the screen.

The process concludes by updating the acquired image with the processing results of the visual effect 712, and displaying the updated image 714.

Figure 8:
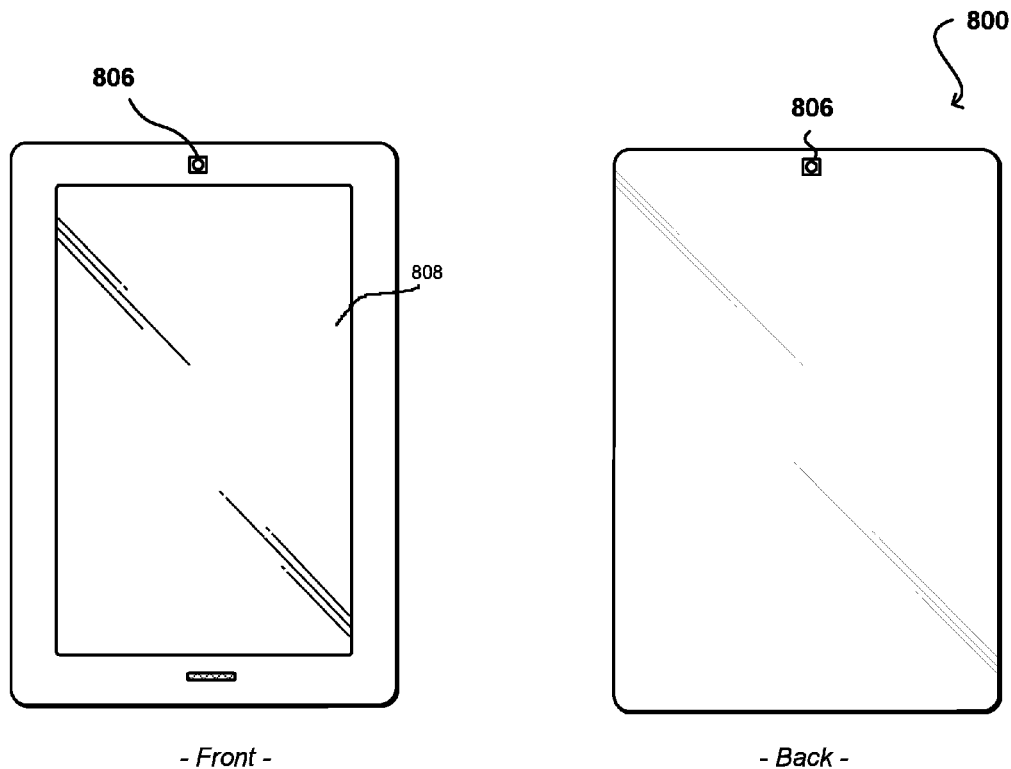
FIG. 8 illustrates an example computing device that can be used in accordance with various embodiments.

FIG. 8 illustrates an example computing device 800 that can be used to perform approaches described in accordance with various embodiments. In this example, the device includes cameras 806 located at the top on each of a same and opposite side of the device as a display element 808, and enabling the device to capture images in accordance with various embodiments. It should be understood that, while the components of the example device are shown to be on a "front" and "back" of the device, there can be similar or alternative components on the "side" of the device as well (or instead). Further, directions such as "front," "back," "top," "bottom," and "side" are used for purposes of explanation and are not intended to require specific orientations unless otherwise stated.

Figure 9:
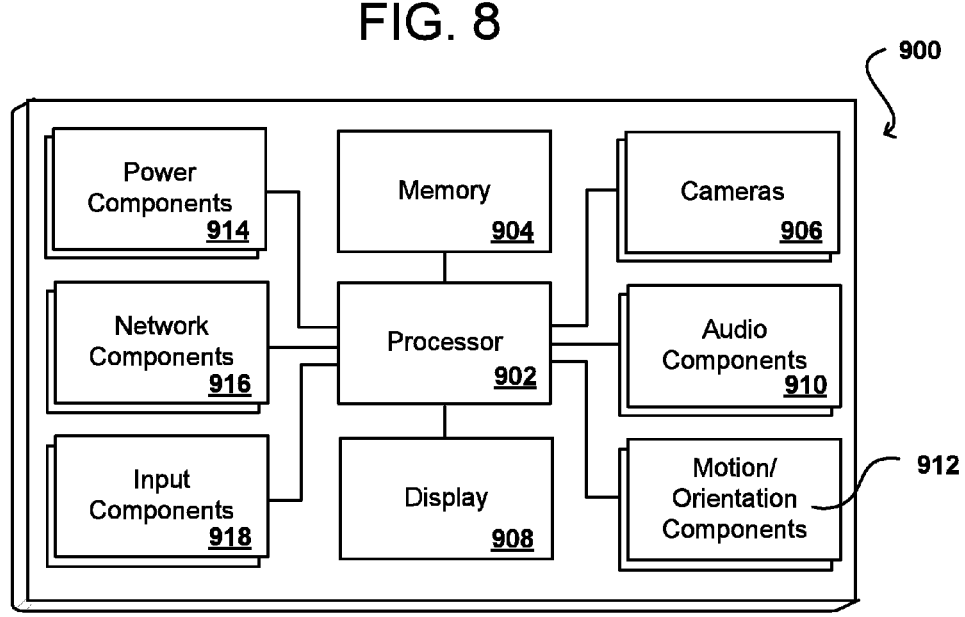
FIG. 9 illustrates an example configuration of components of a computing device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory component 904. As would be apparent to one of ordinary skill in the art, the memory component can include many types of memory, data storage, or non-transitory computer-readable storage media, such as a first data storage for program instructions for execution by the processor 902, a separate storage for images or data, a removable memory for sharing information with other devices, etc. The device typically will include some type of display element 908, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 906 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component 910, such as a mono or stereo microphone or microphone array, operable to capture audio information from at least one primary direction. A microphone can be a uni- or omni-directional microphone as known for such devices.

The device 900 also can include one or more orientation and/or motion sensors 912. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

The computing device 900 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 914 known in the art for providing power to a computing device, which can include capacitive charging elements for use with a power pad or similar device. The computing device can include one or more communication elements or networking sub-systems 916, such as a Wi-Fi, Bluetooth, RF, wired, or wireless communication system. The device in many embodiments can communicate with a network, such as the Internet, and may be able to communicate with other such devices. In some embodiments the device can include at least one additional input element 918 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

In some embodiments, the device 900 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 900 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 900 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

Figure 10:
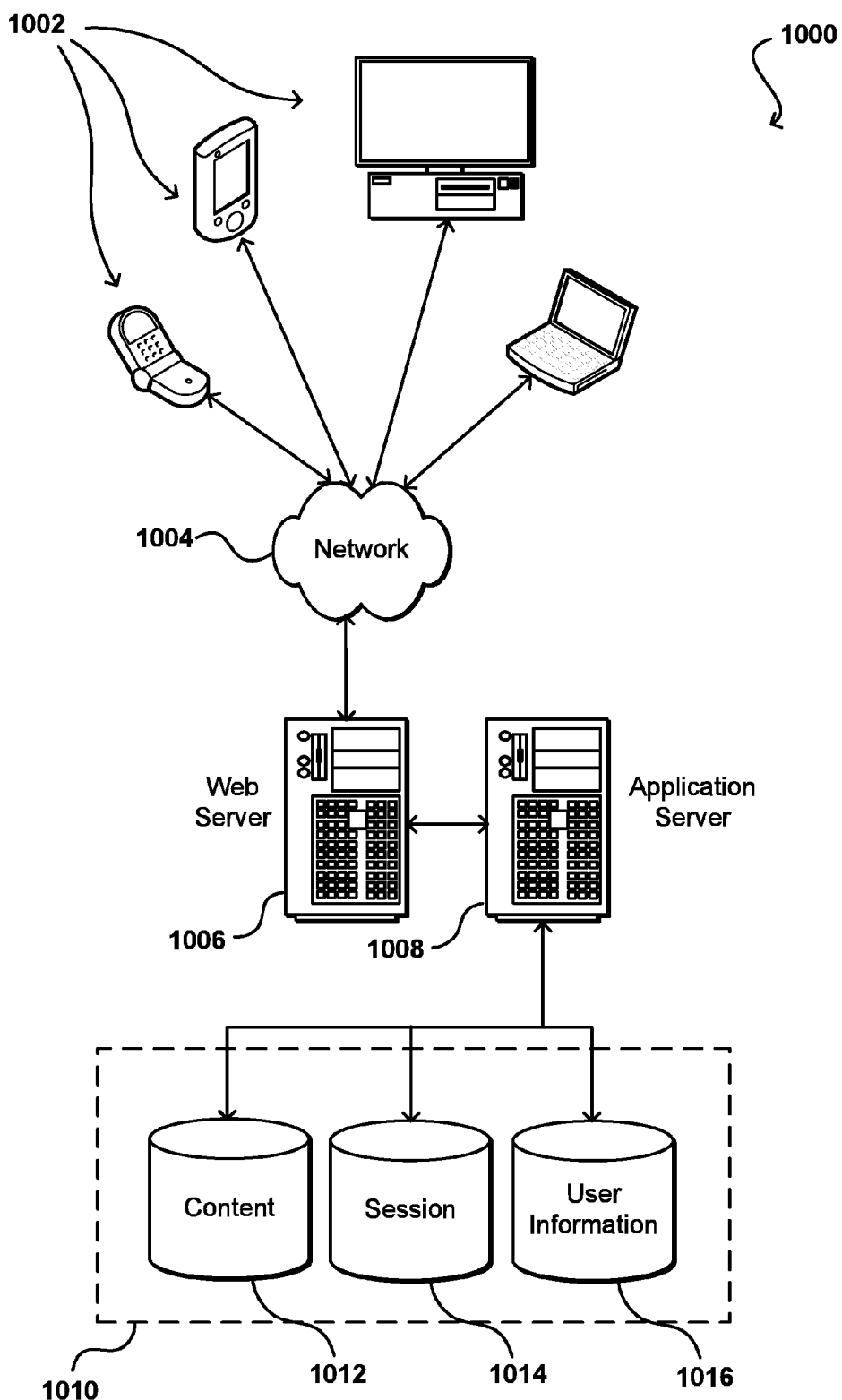
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a processor;
a camera;
a display screen; and
memory including instructions that, when executed by the processor, cause the computing device to:
capture image data of a live camera view by the camera, the image data including a representation of an object;
obtain an image processing mask used to process previously captured image data that includes a portion of the representation of the object;
analyze the image data using the image processing mask to determine an area of the image data that includes the representation of the object and information identifying the object;
determine a visual effect based at least in part on the information;
apply a plurality of linear convolution filters to blend pixels in the area with pixels outside the area to generate an erased portion of the image data;
substitute the erased portion of the image data with a representation of a different object; and
display the representation of the different object on a display screen of the computing device.

2. The computing device of claim 1, wherein the instructions when executed cause the computing device to:
identify the area of the image data that includes the representation of the object;
select a plurality of pixels of the image data corresponding to the area;
calculate respective values for each of the plurality of pixels for the visual effect; and
modify the plurality of pixels based at least in part on the respective values for each of the plurality of pixels.

3. The computing device of claim 1, wherein the image processing mask is generated using a thread executing on the computing device.

4. The computing device of claim 1, wherein the image processing mask is generated using a thread executing on a remote server in communication with the computing device.

5. The computing device of claim 1, wherein the instructions when executed to generate the modified image data cause the computing device to:
apply at least one of a color or a color gradient of a first width to pixels of the image data corresponding to contours of the area of the image data that includes the representation of the object.

6. The computing device of claim 5, wherein the at least one of the color or the color gradient of the first width is applied at a first interval of time, and wherein the instruction when further cause the computing device to:
apply, at a second interval of time, the at least one of the color or the color gradient of a second width to the pixels of the image data corresponding to the contours of the area of the image data that includes the representation of the object.

7. The computing device of claim 1, wherein the representation of the object includes text and the representation of the different object includes one of a translation of a different language corresponding to the text, a synonym corresponding to the text, a change of a color, font, style, or size of the text, or a conversion of handwritten text to digitized text.

8. A computer-implemented method, comprising:
capturing image data of a live camera view by a camera of a computing device, the image data including a representation of an object;
obtaining an image processing mask used to process previously captured image data, the previously captured image data including a region corresponding to a portion of the representation of the object;
determining a visual effect based at least in part on the object;
applying a plurality of linear convolution filters to blend pixels in the region with pixels outside the region to generate an erased portion of the image data;
substituting the erased portion of the image data with a representation of a different object; and
displaying the representation of the different object on a display screen of the computing device.

9. The computer-implemented method of claim 8, wherein the modified image data is displayed substantially in real time on a display screen of the computing device.

10. The computer-implemented method of claim 8, wherein the image processing mask is one of a binary mask or a segmentation mask.

11. The computer-implemented method of claim 10, wherein the binary mask is configured to separate a foreground portion of the image data from a background portion of the image data, and wherein the segmentation mask is configured at least to distinguish between objects represented in the image data, identify objects represented in the image data, or determine an area of the image data that includes a representation of an objects.

12. The computer-implemented method of claim 8, further comprising:
identifying an area of the image data that includes the representation of the object;
selecting a plurality of pixels of the image data corresponding to the area;
calculating respective values for each of the plurality of pixels for the visual effect; and
modifying the plurality of pixels based at least in part on the respective values for each of the plurality of pixels.

13. The computer-implemented method of claim 8, wherein the image processing mask is generated using at least one of a thread executing on the computing device or a thread executing on a device remote server in communication with the computing device.

14. A non-transitory computer-readable storage medium storing instructions for displaying image data, the instructions, which when executed by a processor of a computing device, cause the computing device to:
capturing image data of a live camera view by a camera of a computing device, the image data including a representation of an object;
obtaining an image processing mask used to process previously captured image data, the previously captured image data including a region corresponding to a portion of the representation of the object;
determining a visual effect based at least in part on the object;
applying a plurality of linear convolution filters to blend pixels in the area with pixels outside the area to generate an erased portion of the image data;
substituting the erased portion of the image data with a representation of a different object; and displaying the representation of the different object on a display screen of the computing device.

15. The non-transitory computer-readable storage medium of claim 14, wherein the instructions, when executed further enable the computing device to:
identifying an area of the image data that includes the representation of the object;
selecting a plurality of pixels of the image data corresponding to the area;
calculating respective values for each of the plurality of pixels for the visual effect; and
modifying the plurality of pixels based at least in part on the respective values for each of the plurality of pixels.

16. The non-transitory computer-readable storage medium of claim 14, wherein the image processing mask is generated using at least one of a thread executing on the computing device or a thread executing on a device remote server in communication with the computing device.

* * * * *